United States Patent
Lih et al.

(10) Patent No.: US 9,274,955 B2
(45) Date of Patent: Mar. 1, 2016

(54) REDUCED SCALABLE CACHE DIRECTORY

(71) Applicant: Futurewei Technologies, Inc., Plano, TX (US)

(72) Inventors: Iulin Lih, San Jose, CA (US); Naxin Zhang, Singapore (SG); Chenghong He, Shenzhen (CN); Hongbo Shi, Xian (CN)

(73) Assignee: Futurewei Technologies, Inc., Plano, TX (US)

( * ) Notice: Subject to any disclaimer, the term of this patent is extended or adjusted under 35 U.S.C. 154(b) by 188 days.

(21) Appl. No.: 13/952,895

(22) Filed: Jul. 29, 2013

(65) Prior Publication Data

US 2014/0052916 A1 Feb. 20, 2014

Related U.S. Application Data

(60) Provisional application No. 61/684,322, filed on Aug. 17, 2012.

(51) Int. Cl.
*G06F 12/08* (2006.01)
*G06F 12/12* (2006.01)

(52) U.S. Cl.
CPC ........ *G06F 12/0806* (2013.01); *G06F 12/0826* (2013.01); *G06F 12/121* (2013.01); *G06F 12/0815* (2013.01)

(58) Field of Classification Search
CPC .................... G06F 12/0815; G06F 12/121
USPC .................................. 711/119, 133
See application file for complete search history.

(56) References Cited

U.S. PATENT DOCUMENTS

| 6,438,659 | B1 | 8/2002 | Bauman et al. |
| 6,598,123 | B1 | 7/2003 | Anderson et al. |
| 7,774,551 | B2 | 8/2010 | Gaither et al. |
| 2003/0177317 | A1* | 9/2003 | Anderson et al. ............. 711/146 |

(Continued)

FOREIGN PATENT DOCUMENTS

CN          1991794 A      7/2007

OTHER PUBLICATIONS

Foreign Communication From a Counterpart Application, PCT Application No. PCT/CN2013/081770, International Search Report dated Nov. 28, 2013, 6 pages.

(Continued)

*Primary Examiner* — Than Nguyen
(74) *Attorney, Agent, or Firm* — Conley Rose, P.C.; Grant Rodolph; Brandt D. Howell

(57) ABSTRACT

A processing network comprising a cache configured to store copies of memory data as a plurality of cache lines, a cache controller configured to receive data requests from a plurality of cache agents, and designate at least one of the cache agents as an owner of a first of the cache lines, and a directory configured to store cache ownership designations of the first cache line, and wherein the directory is encoded to support substantially simultaneous ownership of the first cache line by a plurality but less than all of the cache agents. Also disclosed is a method comprising receiving coherent transactions from a plurality of cache agents, and storing ownership designations of a plurality of cache lines by the cache agents in a directory, wherein the directory is configured to support storage of substantially simultaneous ownership designations for a plurality but less than all of the cache agents.

18 Claims, 5 Drawing Sheets

(56) References Cited

U.S. PATENT DOCUMENTS

| | | |
|---|---|---|
| 2004/0039879 A1* | 2/2004 | Gaither .................. 711/145 |
| 2007/0156970 A1 | 7/2007 | Dombrowski et al. |
| 2010/0180084 A1* | 7/2010 | Cypher .................. 711/135 |
| 2011/0320738 A1 | 12/2011 | Blake et al. |
| 2013/0125097 A1* | 5/2013 | Ebcioglu et al. ............. 717/136 |

OTHER PUBLICATIONS

Foreign Communication From a Counterpart Application, PCT Application No. PCT/CN2013/081770, Written Opinion dated Nov. 28, 2013, 6 pages.

* cited by examiner

REDUCED SCALABLE CACHE DIRECTORY

CROSS-REFERENCE TO RELATED APPLICATIONS

The present application claims priority to U.S. Provisional Patent Application No. 61/684,322, filed Aug. 17, 2012 by Iulin Lih, et al., and entitled "Reduced Scalable Cache Directory" which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Modern computer systems may rely on multiple interconnected processors to process data. Such processor(s) and/or resulting processor cluster(s) may perform processing operations on substantially the same data concurrently. To reduce system latency, multiple copies of process data may be stored in multiple memory locations. Such a multi-location storage system may result in a need for a coherent memory scheme. A cache coherent memory scheme may be a protocol that may allow multiple memory components, such as caches and/or Random Access Memory (RAM), to maintain local copies of shared data and receive updates when the shared data is modified by other components and/or processes.

SUMMARY

In one embodiment, the disclosure includes a processing network comprising a cache configured to store copies of memory data as a plurality of cache lines, a cache controller configured to receive data requests from a plurality of cache agents, and designate at least one of the cache agents as an owner of a first of the cache lines, and a directory configured to store cache ownership designations of the first cache line, and wherein the directory is encoded to support substantially simultaneous ownership of the first cache line by a plurality but less than all of the cache agents.

In another embodiment, the disclosure includes a processing network comprising a memory component configured to store copies of shared memory data as a plurality of cache lines, receive data requests for the cache lines from a plurality of cache agents, and maintain a directory to store cache ownership designations of the cache lines by the cache agents, and wherein the directory is encoded to substantially simultaneously designate ownership of any, but less than all, of the stored cache lines.

In another embodiment, the disclosure includes a method comprising receiving coherent transactions from a plurality of cache agents, and storing ownership designations of a plurality of cache lines by the cache agents in a directory, wherein the directory is configured to support storage of substantially simultaneous ownership designations for a plurality but less than all of the cache agents.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
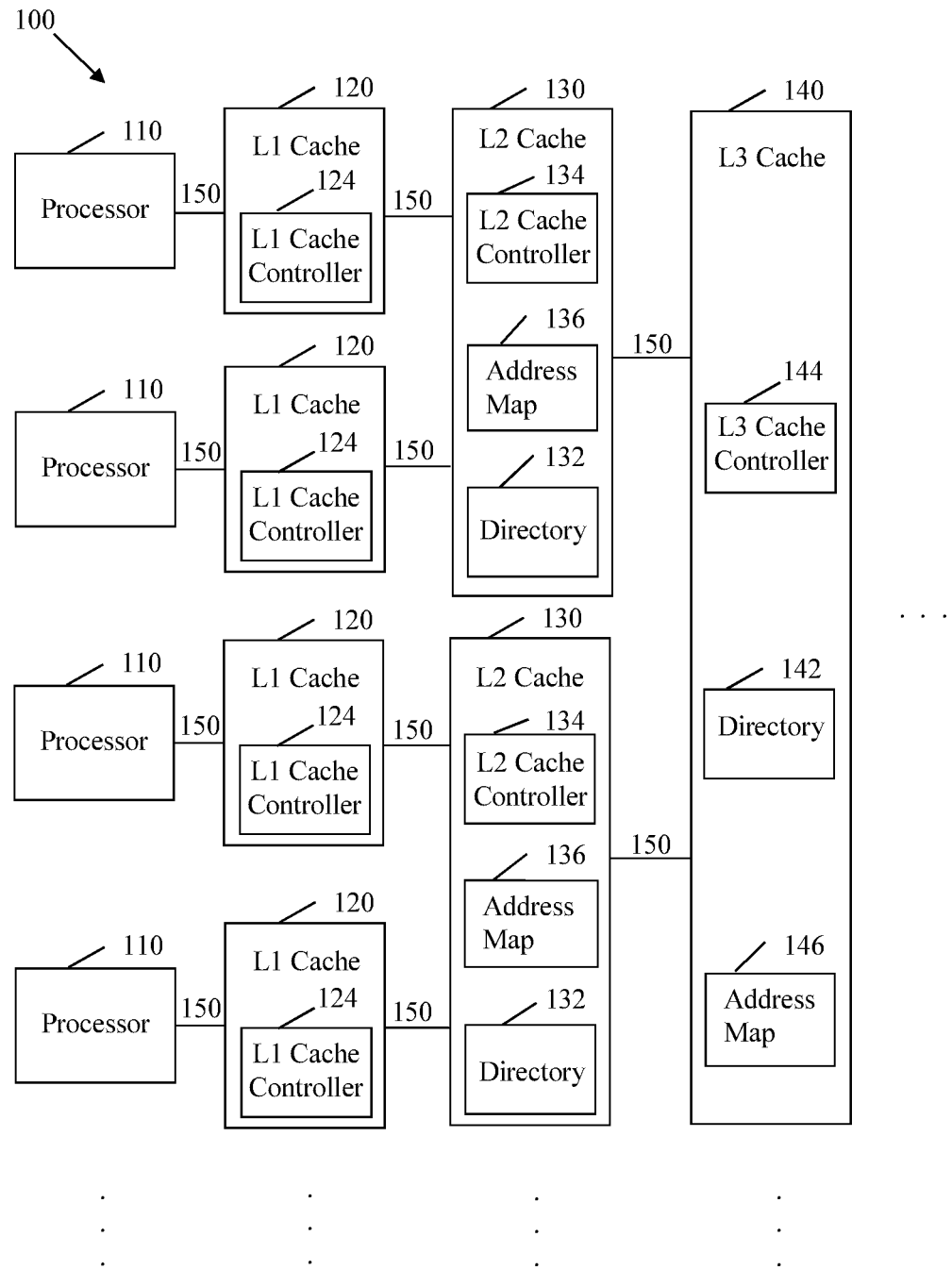
FIG. 1 is a schematic diagram of an embodiment of a multiprocessor network architecture.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Processors may make changes to memory as part of performing the processing function. Processors may make such changes by updating local copies of data stored in a cache memory. Such changes may then be propagated toward main memory. Such a system may result in errors in multiprocessor systems as a first processor may make changes to a first local copy of data and a second processor may substantially contemporaneously make changes to a second local copy of the same data without knowledge of the changes made by the first processor. Such errors may be alleviated by a cache coherence scheme. A cache directory or snoop filter (hereinafter referred to as a cache directory or as a directory) may be a table that records sharing and cache out status for a system's cache lines. The cache directory may be used to guide cache access and/or snoop processes in shared memory systems as part of a cache coherency scheme. Each cache line may be accessed by various cache agents, each of which may be designated as an owner of a given cache line.

Disclosed herein are cache directory embodiments that may exhibit improved scalability for shared memory parallel computing systems. The cache directory may comprise a reduced table width, which may be limited to comprise a static number of owner columns for each cache line, instead of providing a column for each and every potential cache line owner. The directory may comprise a reduced table depth, which may be limited to comprise a static number of entries instead of providing a row for each and every possible cache line. If a number of entities wishing to share ownership of a cache line exceed the directory's recording capability, the directory may force one or more owner(s) to give up ownership of another cache line. Similarly, if a number of requested cache lines exceed the directory's recording capability, the directory may force all owners of a cached line to give up ownership, which may remove the line from the directory. By limiting the number of owners per cache line and the number of cached lines represented in the directory at a time, the directory size may be reduced, which may improve the access speed. Additionally, a directory with a static width and/or depth may support a processor network of varying complexity without substantial modification. Limiting the directory depth may, in some embodiments, result in false cache misses. An address map may be employed to determine whether a potential miss should be treated as a miss or as an instruction to broadcast requests to all the lower level caches. Selection of the directory width and depth limits may be based on statistical analysis in order to minimize loss of ownership and broadcasts.

FIG. 1 is a schematic diagram of an embodiment of a multiprocessor network architecture. The network 100 may comprise a plurality of processors 110 which may be coupled to level 1 (L1) caches 120, level 2 (L2) caches 130, and level 3 (L3) caches 140, via a routing network 150. L1 caches 120 may each comprise a L1 cache controller 124. L2 caches 130 may each comprise an L2 cache controller 134, address map 136, and directory 132. L3 cache 140 may comprise an L3 cache controller 144, directory 142, and address map 146. Higher order caches may store data and respond to requests from lower order caches and/or processors. Each entity may act as a cache agent and/or a home agent. A home agent may be a higher order entity that responds to requests. A cache agent may be a lower order entity that makes requests. Depending on the embodiment, a memory component (e.g. cache 120, 130, 140 and/or RAM) may act as both a home agent to a lower order memory component and a cache agent to a higher order memory component, potentially in regard to the same transaction and/or series of transactions.

The processors 110 may be referred to as central processing units or CPUs. The processors 110 may be entities within a network 100 that process instructions of a program by performing arithmetical, logical, and/or input/output operations of the network 100. The processors 110 may each comprise an arithmetic logic unit that may perform arithmetical, logical, and/or other operations and a control unit that may request instructions from memory (e.g. caches 120, 130, and/or 140). The control unit may also decode and execute such instructions in conjunction with the arithmetic logic unit.

The L1 caches 120, L2 caches 130, and L3 caches 140 may be components that may transparently store data and may provide rapid responses to requests. For reasons of cost and data use efficiency, the caches 120, 130, and 140 may comprise relatively small memory and may be located in close proximity to the CPUs 110. Lower order caches, such as L1 caches 120, may comprise less storage space and may be located closer to the CPUs 110, while higher order caches, such as L3 cache 140, may comprise more space and may be located farther away from the CPUs 110. The position and size of the caches 120, 130, and/or 140 may be selected to balance design goals of storage and low latency. Caches 120, 130, and/or 140 may each store local copies of data maintained in main memory (e.g. RAM).

The L1 cache controllers 124, L2 cache controllers 134, and L3 cache controllers 144 may be programs and/or components configured to manage cache memory. For example, cache controllers 124, 134, and/or 144 may ensure that data in the caches is valid or marked as invalid. Cache controllers 124, 134, and/or 144 may also service cache misses and update requests such as cache line state updates and data updates. The cache controller may also handle interrupt requests and generate data replies. Cache controllers 124, 134, and/or 144 may also perform other functions as needed to maintain cache coherence between the caches 120, 130, and/or 140 and/or provide associated logical functions.

The L2 directory 132 and L3 directory 142 may be components and/or programs configured to maintain data regarding cache line usage at a specified time. For example, a directory 132 and/or 142 may comprise a table or tables and may indicate cache line addresses, cache line ownership (e.g. data indicating that caches 120, 130, and/or 140 may be storing and/or modifying a cache line at a specified time), and/or other attributes related to the cache line. Directories 132 and/or 142 may further comprise index values, which may be employed to manage the table(s). Directories 132 and/or 142 may be employed to maintain coherence between caches 120, 130, and/or 140. For example, a plurality of processors 110 may perform operations on data in the same memory location substantially simultaneously. Such data may be owned (e.g. cached and/or stored) in a plurality of caches 120, 130, and/or 140 substantially simultaneously. The directory 132 and/or 142 may indicate all cache owners so that each owner may be informed (e.g. by a cache controller 124, 134, and/or 144) when data stored in their cache is modified by another processor and/or cache. Informing each cache owner of such changes may allow each cache to maintain an accurate, updated local copy of main memory data, which may allow cache coherence to occur. A directory 132 and/or 142 may also be referred to as a snoop filter, as caches may snoop (e.g. query/monitor) the status of cache lines via the directory.

The L2 address map 136 and L3 address map 146 may be components and/or programs configured to direct cache controller responses in case of a potential cache miss. For example, the address maps 136 and/or 146 may be used to indicate whether a cache miss should be treated as a miss or as a broadcast to all the memory locations and/or all lower order caches. For example, a proportionally large number of caches may own a specific cache line at a specified time. In such a case, a controller 124, 134, and/or 144 may set a value in an associated address map 136 and/or 146 to indicate that all relevant caches should be informed of changes to the cache line via broadcast, which may allow the cache line to be removed from the directory 132 and/or 142. As another example, a specified cache line may not be in use by any cache at a specified time. In such a case, the address map 136 and/or 146 may indicate that the cache line's absence from the directory 132 and/or 142 should be treated as a miss. The default status of a cache line in an address map may be miss, broadcast, or combinations thereof.

Routing network 150 may comprise a plurality of physical channels and/or a plurality of virtual channels that may be employed to transmit messages and/or data between nodes of network 100. Physical channels may comprise conductive material and/or physical components that may electrically couple nodes of network 100 (e.g. processors 110, caches 120, 130, and/or 140, and/or associated RAM). For example, routing network 150 may comprise serial and/or parallel buses. Virtual channels may be logical abstractions of physical channels. For example, a virtual channel may be implemented by employing a buffer and time division multiplexing. Messages may be stored in a buffer and allocated to various virtual channels. Each virtual channel may be multiplexed onto the same physical channel and/or set of physical channels in the time domain such that the virtual channels may traverse substantially the same hardware, but may be afforded different rules such as varying transmission priority, latency, etc.

Figure 2:
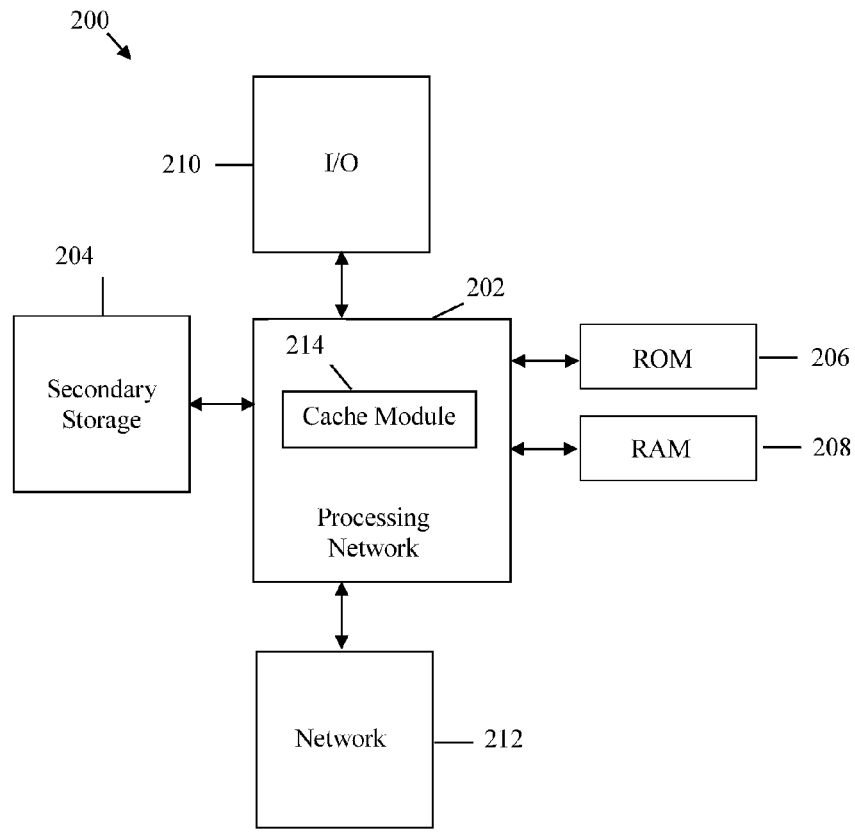
FIG. 2 is a schematic diagram of an embodiment of a general-purpose computer system.

The devices, systems, and methods described above may be implemented on any general-purpose network component, such as a computer or network component with sufficient processing power, memory resources, and network throughput capability to handle the necessary workload placed upon it. FIG. 2 illustrates a typical, general-purpose network component 200 suitable for implementing one or more embodiments of the components and/or methods disclosed herein. The network component 200 includes a processing network 202 (which may be referred to as a central processor unit (CPU) cluster) that is in communication with memory devices including secondary storage 204, read only memory (ROM) 206, RAM 208, input/output (I/O) devices 210, a cache module 214, and network connectivity devices 212. The processing network 202 may be implemented as one or more CPU 110 chips, and/or may be part of one or more application specific integrated circuits (ASICs) and/or digital signal processors (DSPs). Cache module 214 may comprise a plurality of caches, such as caches 120, 130, and/or 140, and may store local copies of main memory data (e.g. from storage 204, memory 206, and/or memory 208) for fast access by the processing network 202.

The secondary storage 204 is typically comprised of one or more disk drives or tape drives and is used for non-volatile storage of data and as an over-flow data storage device if RAM 208 is not large enough to hold all working data. Secondary storage 204 may be used to store programs that are loaded into RAM 208 when such programs are selected for execution. The ROM 206 is used to store instructions and perhaps data that are read during program execution. ROM 206 is a non-volatile memory device that typically has a small memory capacity relative to the larger memory capacity of secondary storage 204. The RAM 208 is used to store volatile data and perhaps to store instructions. Access to both ROM 206 and RAM 208 is typically faster than to secondary storage 204. Network 100, directories 300, 400, 500, and/or 600, and method 700 may be stored and/or implemented in processing network 202, RAM 208, ROM 206, the cache module 214, and/or secondary storage 204.

It is understood that by programming and/or loading executable instructions onto the network component 200, at least one of the processing network 202, cache module 214, ROM 206, RAM 208, secondary storage 204, network 212, and/or I/O are changed, transforming the network component 200 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Figure 3:
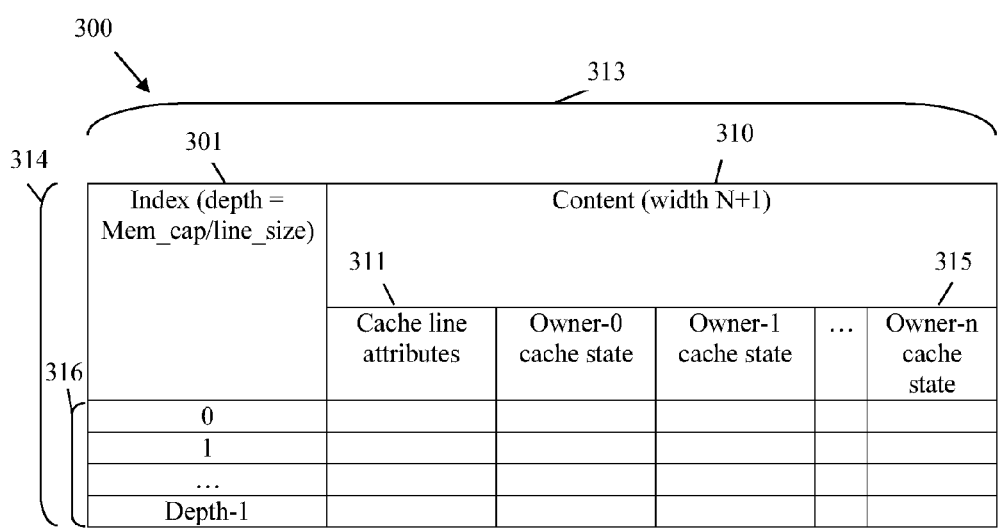
FIG. 3 illustrates an embodiment of a RAM based directory.

FIG. 3 illustrates an embodiment of a RAM based directory, which may be implemented as a table 300. The RAM based directory table 300 may be implemented on RAM 208 and may be similar to cache directories 132 and/or 142. The table 300 may comprise a width 313 and a depth 314. The width 313 of the table 300 may depend on the total number of cache agents (e.g. caches 120, 130, and/or 140) in the network while the depth 314 of the table 300 may depend on the number of potential cache lines in the shared memory (e.g. in RAM 208 and/or ROM 206). The width 313 may be broken up into vertical columns, in which column 301 may store an index value related to each cache line, and content section 310 may store content of the directory. Content section 310 may be broken up into additional vertical columns, in which column 311 may store attributes related to each cache line, and additional columns 315 may store information concerning ownership of each cache line and other cache state information relating to both cache agent and cache line. Table 300 may comprise a dedicated owner cache state column 315 for each cache agent (e.g. column Owner-0 may be associated with a first cache agent, column Owner-1 may be associated with a second cache agent, etc.). Content section 310 may comprise a width of N+2, where N is the number of caches (e.g. potential cache line owners) in the associated network. The table 300 may comprise rows 316, which may be indexed from 0 to depth-1 where depth is the capacity of the shared memory divided by the cache line size. There may be a row 316 for every cache line, except that any un-snooped locations (e.g. non-coherent memory locations) may be omitted in some implementations. The cache state information may be stored in each row 316, column 311, and/or column 315 and may be determined by an implementation protocol used by the network. For example, the cache state information may comprise a Modified state, Exclusive state, Shared state, Owned state, Invalid state, Forward state, and combinations thereof. A Modified state may indicate that the associated cache line comprises so called dirty data, which may refer to local data that may comprise a different value than the value of the associated location in the shared memory. Owned state may indicate that the data is dirty and may be shared in dirty form (e.g. prior to a shared memory update). For example, Owned data may have been updated by the owner, but such updates may not have been forwarded to the shared memory. Owners of such Owned state data may be required to update shared memory at a future point, for example upon request or upon completion of a process. Exclusive state may indicate the local data is clean, which may mean the local data value matches the data value in the shared memory. Exclusive state may also indicate that the local data is stored in a single memory component. Shared state may indicate that local data is clean and stored in a plurality of memory components. Invalid state may indicate that the associated memory location is unused and/or does not comprise useful data.

Figure 4:
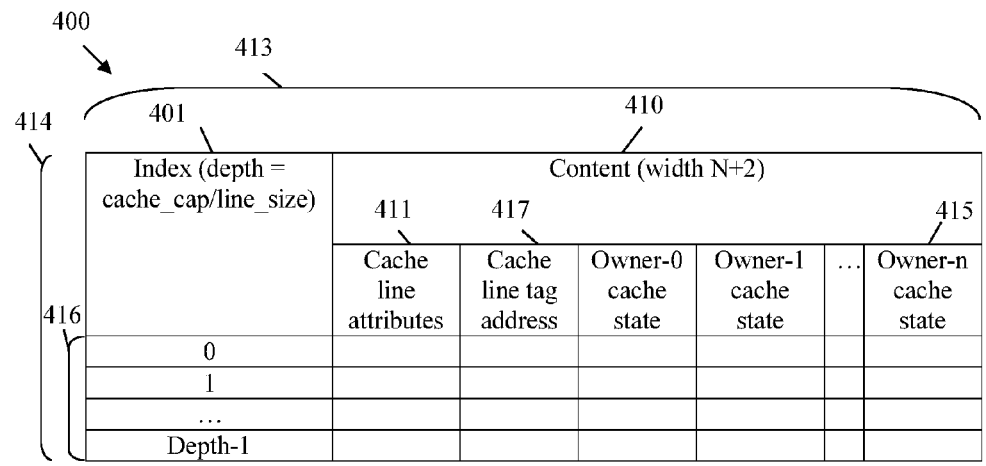
FIG. 4 illustrates an embodiment of a cache based directory.

FIG. 4 illustrates an embodiment of a cache based directory, which may be implemented as a table 400. The cache based directory table 400 may be implemented on cache module 214 and may be similar to cache directories 132 and/or 142. Table 400 may comprise a width 413, a depth 414, a content section 410, columns 401, 411, and 415, and rows 416, which may be substantially similar to width 313, depth 314, content section 310, columns 301, 311, and 315, and rows 316, respectively. Table 400 may further comprise column 417, which may comprise cache line address information. As content section 410 may comprise one more column than content section 310 (e.g. due to column 417), content section 410 may comprise a width of N+2, where N is the number of cache agents (e.g. potential cache line owners) in the associated network.

The directory tables 300 and/or 400 may comprise a relatively large total directory capacity, for example, in systems with large numbers of cache agents and/or a large shared memory. The directory tables 300 and/or 400 may comprise a data location for state data relating each cache agent and each cache line. However, experimental observations of shared memory systems indicate that the total number of owners of a given cache line at any specified time may typically be very small (e.g. rarely more than three) and may not be proportional to the total number of cache agents. As such, a significant number of directory rows and/or locations for cache state data may be unused at a specified time. Experimental observations of shared memory systems also indicate that the total number of cache lines owned by agents per distributed memory block may not be a strong function of the total cache capacity. As such, proportional enlargement of the directory for increased cache size may be unnecessary. Therefore, the directory depth per home agent may be fixed to reduce the directory size. Read-only memory locations, such as a lookup table or instructions that comprise non-self-modified code, may constitute an exception to the above-mentioned experimental observations. However, if the snoop frequency (e.g. access frequency) is expected to be low for such locations in a given implementation, the locations may be omitted from the directory and accessed via a broadcast snoop instead of a direct snoop guided by the directory. Compared to the full directory approach of tables 300 and 400, tables 500 and/or 600 as discussed below may be implemented by employing fewer bits in each entry and fewer entries in total, which may lead to an improvement in area, power and/or access speed of the directory.

Figure 5:
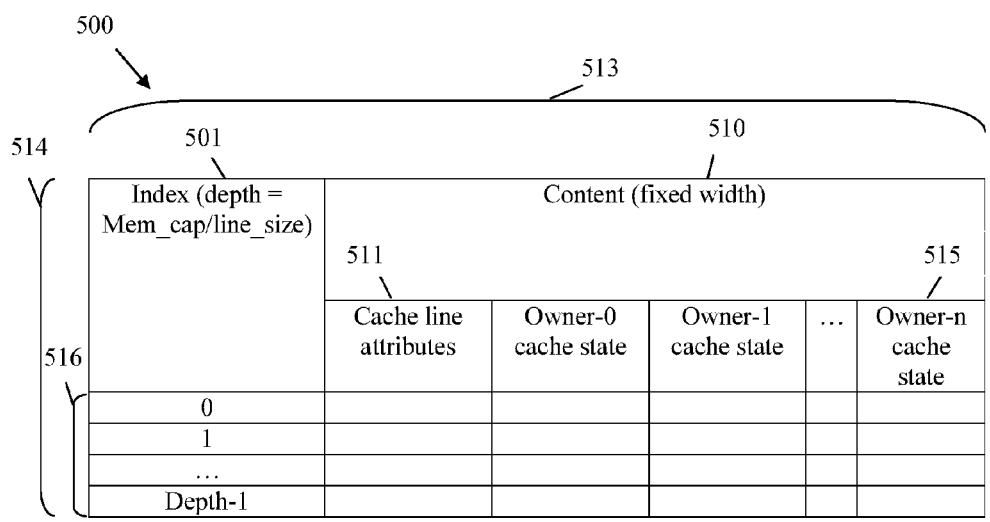
FIG. 5 illustrates another embodiment of a RAM based directory.

FIG. 5 illustrates another embodiment of a RAM based directory which may be implemented as a table 500. The RAM based directory table 500 may be implemented on RAM 208 and may be similar to cache directories 132 and/or 142. Table 500 may comprise a width 513, a depth 514, a content section 510, columns 501, 511, and 515, and rows 516, which may be substantially similar to width 313, depth 314, content section 310, columns 301, 311, and 315, and rows 316, respectively. In contrast to tables 300 and 400, content section 510 may comprise a fixed width by limiting the number of columns 515. As such, each potential cache 120, 130, and/or 140 may not be granted a dedicated column 515. For example, a cache line may be encoded in a row 516. A value indicating the identity of a first cache owner may be dynamically positioned in a cell corresponding to an intersection between the associated row 516 and owner-0 cache state column 515. In the event of a second owner, a value indicating the second owner may be dynamically positioned in a cell in owner-1 cache state column 515. Additional owners may be added as needed until all columns 515 become employed. Once all columns 515 become employed, the cache line may be treated as a broadcast line (e.g. by indicating such in an address map) and/or removed from the table 500. Experimental evidence indicates cache lines may rarely be owned by a large number of caches simultaneously. As such, treatment as a broadcast line may occur rarely and may have a minimal effect on system performance. Further, fixing the number of columns 515 to a specific value (for example, to three columns, four columns, etc.) may reduce directory size and increase access speed. Further, a table 500 with a fixed number of columns 515 may be employed in networks with varying numbers of caches without significant customization which may support network scalability.

Figure 6:
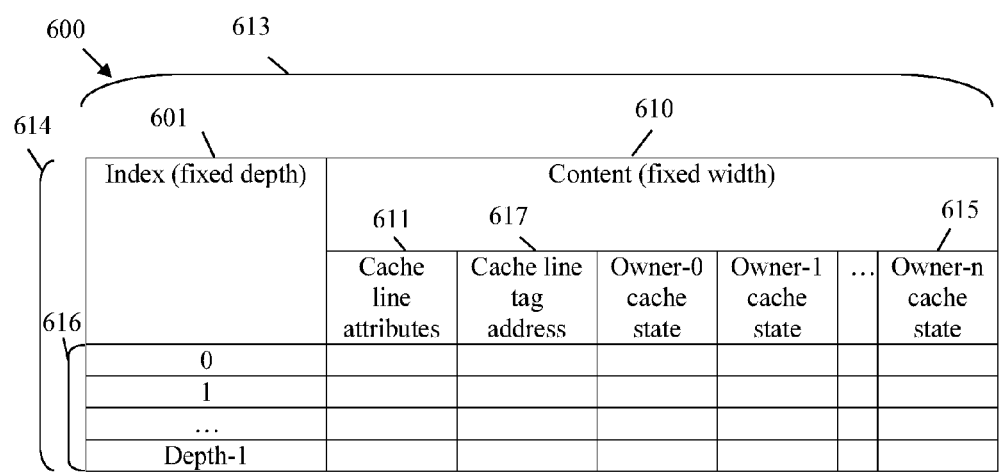
FIG. 6 illustrates another embodiment of a cache based directory.

FIG. 6 illustrates another embodiment of a cache based directory, which may be implemented in a table 600. The cache based directory table 600 may be implemented on cache module 214 and may be similar to cache directories 132 and/or 142. Table 600 may comprise a width 613, a depth 614, a content section 610, columns 601, 611, 617, and 615, and rows 616, which may be substantially similar to width 413, depth 414, content section 410, columns 401, 411, 417, and 415, and rows 416, respectively. In contrast to table 400, table 600 may comprise a fixed content width 610 by comprising a limited number of columns 615 in a similar manner to table 500. Further, table 600 may comprise a fixed depth 614 by limiting the number of rows 616. As such, each cache memory block may not be assigned a dedicated row 616. Experimental evidence indicates that increasing memory size of the home agent may not proportionally increase the number of cached lines a cache agent network may request at a specified time. As such, fixing the number of rows 616 in a home agent directory may allow memory locations of the home agent to be cached as needed and dynamically included in the table 600 without allocating unused table 600 space for un-cached lines. In the event that all rows 616 are employed, a cache controller, such as cache controller 124, 134, and/or 144, may obtain additional space by converting a cache line to a broadcast line and removing such a line from the table 600. Such a response may be appropriate when a cache line to be evicted (e.g. removed) is owned by a proportionally large number of home agents. In another embodiment, a cache line may be evicted by causing associated cache owners to give up ownership of a line (e.g. by causing a forced write back). As with fixing width 613, fixing depth 614 may reduce the size of table 600, which may decrease storage space requirements and increase access speed. Fixing depth may also increase the scalability of table 600 in large memory networks (e.g. by allowing a small directory to support a large home agent) and may reduce customization requirements by allowing table 600 to be employed with networks comprising home agents with varying memory sizes.

The foregoing tables 300, 400, 500, and/or 600 are discussed hereinabove in terms of rows and columns. One skilled in the art will recognize that the terms row and column are a matter of nomenclature and that a table's rows and columns may be alternated without changing the fundamental structure of the table. Thus, the use of the terms row and column herein should not be considered limiting.

Figure 7:
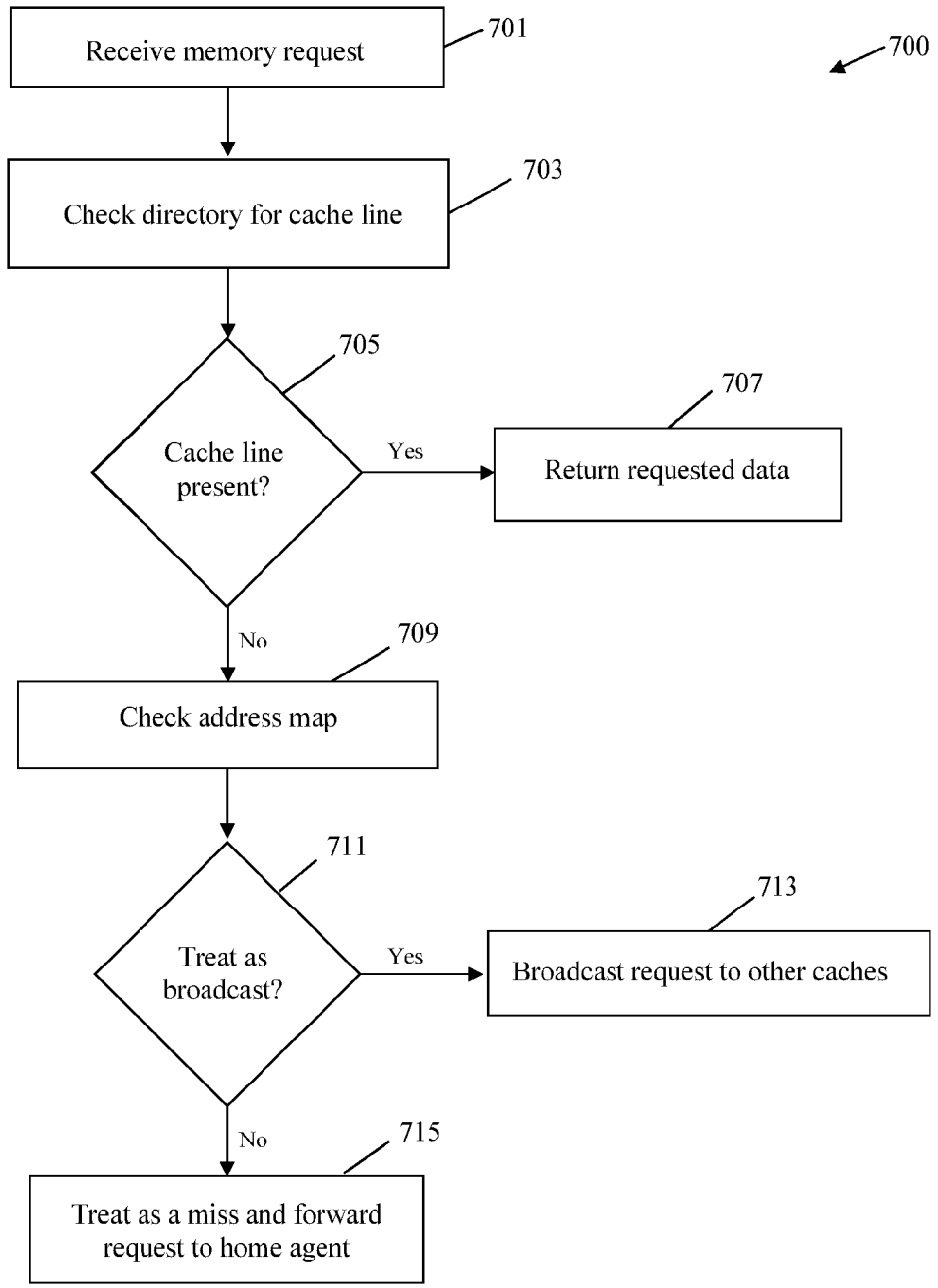
FIG. 7 is a flowchart of an embodiment of a method of managing a memory request.

FIG. 7 is a flowchart of an embodiment of a method 700 of managing a memory request. Method 700 may be implemented by a cache controller such as cache controller 124, 134, and/or 144 and/or cache module 214. At step 701, a memory request is received by a home agent (e.g. caches 120, 130, or 140). The home agent's cache controller may check an associated directory (e.g. directory 132 and/or 142) for the requested cache line in step 703. At step 705, the cache controller may determine whether the requested cache line is present in the directory. If the requested cache line is present, the cache controller may return the requested data at step 707 and/or perform a snoop on behalf of the cache agent). If the requested cache line is not present, the cache controller may check the associated address map (e.g. address map 136 or 146) at step 709. At step 711, the cache controller may determine whether the potential miss should be treated as a broadcast. If the potential miss should be treated as a broadcast (e.g. according to the address map), the home agent may broadcast the request to the other caches (e.g. lower order caches) in the network, at step 713. If the potential miss should not be treated as a broadcast, the cache controller may treat the potential miss as a miss and forward the request to the next higher order cache and/or memory location, which may act as a home agent for the cache receiving the request at step 701.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: R=Rl+k*(Ru+Rl), wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. The use of the term about means ±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A processing network comprising:
   a cache configured to store copies of memory data as a plurality of cache lines;
   a cache controller configured to:
      receive data requests from a plurality of cache agents; and
      designate at least one of the cache agents as an owner of a first of the cache lines; and
   a directory configured to store cache ownership designations of the first cache line,
   wherein the directory is encoded to support substantially simultaneous ownership of the first cache line by a plurality but less than all of the cache agents, and
   wherein the cache controller is further configured to invalidate ownership by at least one of the cache line owners when the cache controller receives a data request for ownership of the first cache line by a first of the cache agents and when the first cache line is owned by a maximum number of owners other than the first cache agent.

2. The processing network of claim 1, wherein the directory comprises a table, wherein a maximum substantially simultaneous ownership is limited by a number of table columns, and wherein at least one of the columns comprises ownership data for a plurality of cache agents.

3. The processing network of claim 1, wherein the directory comprises a table, wherein a maximum substantially simultaneous ownership is limited by a number of table rows, and wherein at least one of the rows comprises ownership data for a plurality of cache agents.

4. The processing network of claim 1, wherein the directory is further encoded to limit substantially simultaneous ownership of any of the cache lines to a range of three owners to four owners.

5. A processing network comprising:
   a cache configured to store copies of memory data as a plurality of cache lines;
   a cache controller configured to:
      receive data requests from a plurality of cache agents; and
      designate at least one of the cache agents as an owner of a first of the cache lines; and
   a directory configured to store cache ownership designations of the first cache line,
   wherein the directory is encoded to support substantially simultaneous ownership of the first cache line by a plurality but less than all of the cache agents, and
   wherein the cache controller is further configured to designate the cache line as a broadcast cache line when the cache controller receives a data request for ownership of the first cache line by a first of the cache agents and when the first cache line is owned by a maximum number of owners other than the first cache agent.

6. A processing network comprising:
   a memory component configured to:
      store copies of shared memory data as a plurality of cache lines;
      receive data requests for the cache lines from a plurality of cache agents; and
      maintain a directory to store cache ownership designations of the cache lines by the cache agents,
   wherein the directory is encoded to substantially simultaneously designate ownership of any, but less than all, of the stored cache lines, and wherein the directory is further encoded to limit a number of substantially simultaneously designated cache lines to a value associated with a combined memory space of the cache agents.

7. The processing network of claim 6, wherein the directory is further encoded to limit a number of substantially simultaneously designated cache lines to a value greater than a maximum number of cache lines storable in a first of the cache agents and less than a maximum number of cache lines storable in all cache agents.

8. A processing network comprising:
a memory component configured to:
store copies of shared memory data as a plurality of cache lines;
receive data requests for the cache lines from a plurality of cache agents; and
maintain a directory to store cache ownership designations of the cache lines by the cache agents,
wherein the directory is encoded to substantially simultaneously designate ownership of any, but less than all, of the stored cache lines, and
wherein the memory is further configured to act as a home agent by invalidating ownership of a first cache line when the memory receives an ownership request for a second cache line and when the directory is full of designated cache lines.

9. A processing network comprising:
a memory component configured to:
store copies of shared memory data as a plurality of cache lines;
receive data requests for the cache lines from a plurality of cache agents; and
maintain a directory to store cache ownership designations of the cache lines by the cache agents,
wherein the directory is encoded to substantially simultaneously designate ownership of any, but less than all, of the stored cache lines,
wherein the memory is configured to act as a home agent, and
wherein the memory comprises an address map configured to store data directing home agent response behavior when a cache line cannot be found in the directory.

10. The processing network of claim 9, wherein the address map indicates home agent response behavior by a memory region associated with the cache line that is not found in the directory.

11. The processing network of claim 9, wherein the address map indicates that the unfound cache line should be treated as a cache line miss.

12. The processing network of claim 9, wherein the address map indicates that the unfound cache line should be treated as a broadcast cache line.

13. A method comprising:
receiving coherent transactions from a plurality of cache agents; and
storing ownership designations of a plurality of cache lines by the cache agents in a directory,
wherein the directory is configured to support storage of substantially simultaneous ownership designations for a plurality but less than all of the cache agents,
wherein the directory comprises a table,
wherein a maximum substantially simultaneous ownership of each cache line is equal to a number of table rows such that the number of table rows is less than a number of the cache agents, and
wherein at least one of the rows comprises ownership data for the plurality of cache agents.

14. The method of claim 13, wherein the directory is further configured to substantially simultaneously store less than all of the cache lines.

15. The method of claim 14, wherein the directory is a Random Access Memory (RAM) based directory.

16. The method of claim 14, wherein the directory is a cache based directory.

17. The method of claim 14, wherein the directory is suitably configured to operate in conjunction with a variable number of cache agents.

18. The method of claim 14, wherein the directory is suitably configured to operate in conjunction with a variable number of potential cache lines.

* * * * *